United States Patent [19]
Hornsby

[11] 3,747,968
[45] July 24, 1973

[54] AUTOMOBILE CUSHION BUMPER

[76] Inventor: Guyton Ellis Hornsby, 4001 Rose Ln., Annandale, Va. 22003

[22] Filed: Oct. 15, 1971

[21] Appl. No.: 189,593

[52] U.S. Cl. .................................. 293/88, 293/86
[51] Int. Cl. ........................................... B60r 19/10
[58] Field of Search ................ 293/71 R, 71 P, 85, 293/86, 88, 89

[56] References Cited
UNITED STATES PATENTS

| | | | |
|---|---|---|---|
| 2,144,357 | 1/1939 | Booharin | 293/86 |
| 3,187,710 | 6/1965 | Wilfert | 116/28 |
| 1,032,690 | 7/1912 | McGregor | 293/86 |
| 2,236,507 | 4/1941 | Kreitz | 293/71 P |
| 1,521,579 | 12/1924 | Freedman | 293/85 X |
| 1,096,609 | 5/1914 | Dodge | 293/85 |
| 3,203,722 | 8/1965 | Zahorodny | 293/4 |

Primary Examiner—Gerald M. Forlenza
Assistant Examiner—Robert Saifer
Attorney—John B. Dickman

[57] ABSTRACT

An automobile cushion bumper in which an inner bumper bar and an outer bumper bar are separated by a plurality of air bags positioned to absorb the shock of a collision on the outer bumper bar. In a modified form of the invention a plurality of bumper bars are separated by shock absorbing springs with the outer pair of bumper bars being separated by a plurality of air bags for absorbing the shock of collision.

1 Claim, 6 Drawing Figures

Patented July 24, 1973
3,747,968
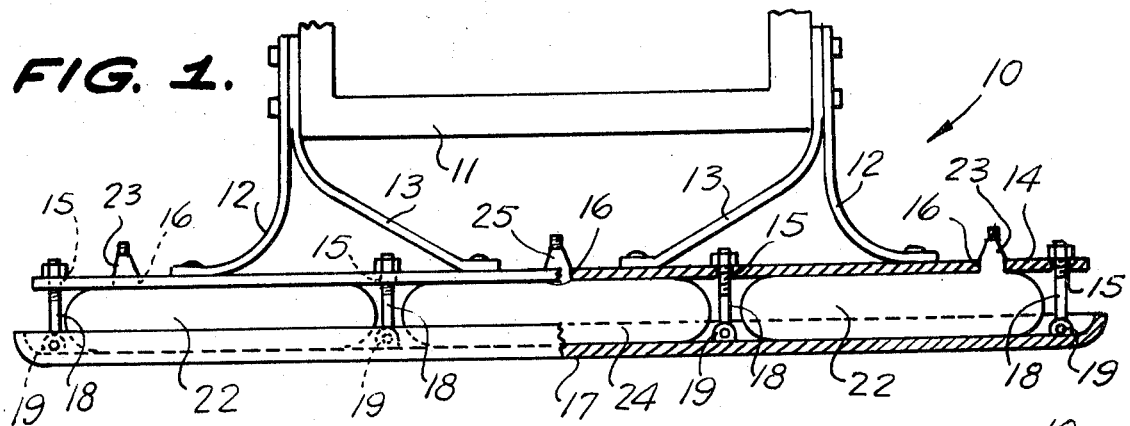
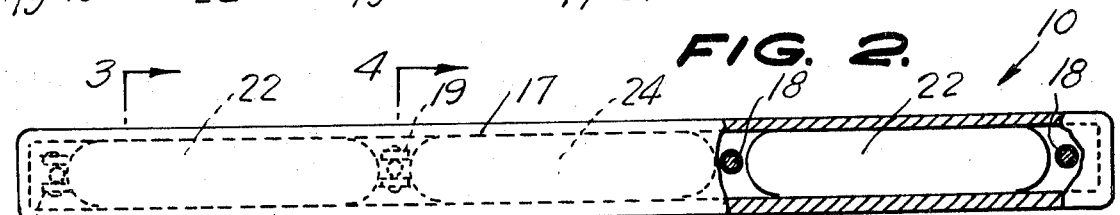
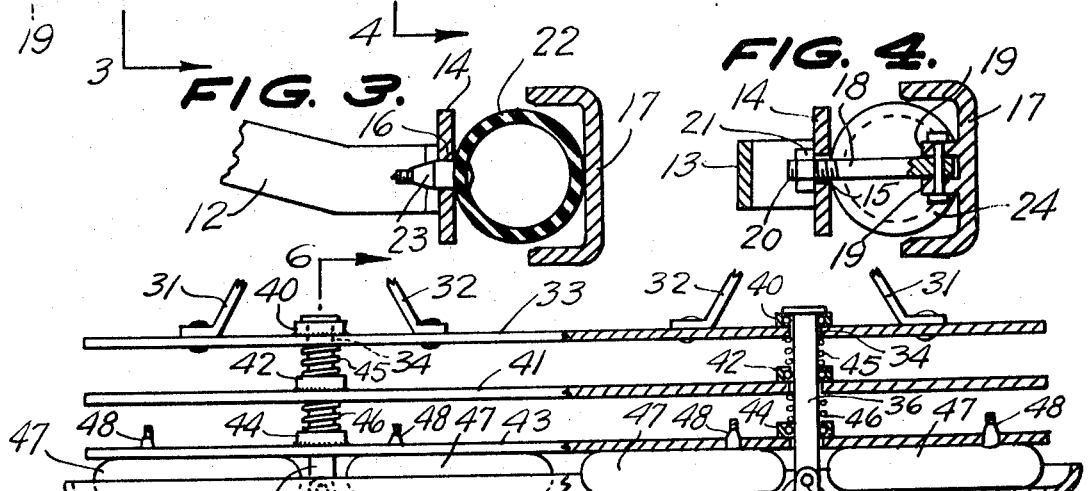
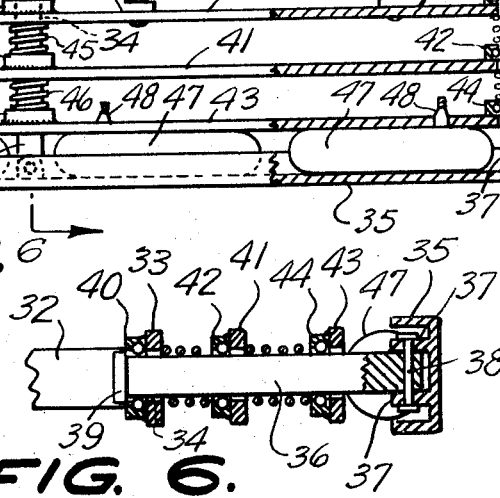
INVENTOR.
GUYTON E. HORNSBY,
BY John B. Dickman III
AGENT.

AUTOMOBILE CUSHION BUMPER

BACKGROUND OF THE INVENTION

FIELD OF THE INVENTION

The present invention relates to automobile bumpers for cushioning the shock of collision.

SUMMARY OF THE INVENTION

An automobile bumper in which a pair of bumper bars are arranged in spaced apart parallel relation and separated by a plurality of shock absorbing air bag cushions. The outer bumper bar is supported on pins which slide through the inner bumper bar on impact.

In a modified form of the invention a plurality of inner bumper bars separated by shock absorbing springs support an outer bumper bar with shock absorbing air bag cushions separating the outer bumper bar from the outer most of the inner bumper bars.

The primary object of the invention is to provide a shock absorbing automobile bumper utilizing air bags as the shock absorbing elements.

Other objects and advantages will become apparent in the following specification when considered in the light of the attached drawings.

BRIEF DESCRIPTION OF THE DRAWINGS

FIG. 1 is a top plan view of the invention shown partially broken away and in section for convenience of illustration;

FIG. 2 is a front elevation of the invention shown partially broken away and in section for convenience of illustration;

FIG. 3 is an enlarged fragmentary vertical sectional view, taken along the line 3—3 of FIG. 2, looking in the direction of the arrows;

FIG. 4 is an enlarged fragmentary vertical sectional view, taken along the line 4—4 of FIG. 2, looking in the direction of the arrows;

FIG. 5 is a top plan view of a modified form of the invention shown partially broken away and in section for convenience of illustration; and FIG. 6 is a longitudinal sectional view, taken along the line 6—6 of FIG. 5, looking in the direction of the arrows.

DESCRIPTION OF THE PREFERRED EMBODIMENT

Referring now to the drawings in detail, wherein like reference characters indicate like parts throughout the several figures, the reference numeral 10 indicates generally a cushion bumper constructed in accordance with the invention.

The cushion bumper 10 is adapted for use with an automobile of the type having a frame 11 having forwardly extending bumper bracket members 12 rigidly secured thereto. A pair of converging bumper braces 13 are similarly secured to the frame 11 and extend forwardly therefrom. The bumper brackets 12 and braces 13 terminate in a straight line and have an inner bumper bar 14 secured thereto extending transversely of the frame 11. The inner bumper bar 14 has a plurality of bores 15 formed therein for reasons to be assigned.

A plurality of bores 16 somewhat larger then the bores 15 are similarly formed in the bar 14 for reasons to be assigned.

Channel shaped outer bumper bar 17 is arranged parallel to the inner bumper bar 14 and has a plurality of pins 18 pivotally secured to the inner face thereof on ears 19. The pins 18 are threaded at 20 at their inner ends to receive nuts 21. The pins 18 extend through the bores 15 in the bars 14 and the nuts 21 secure them therein so they may reciprocate in the bores 15 as the outer bumper bar 17 moves with relation to the inner bumper bar 14. The pivotal mounting of the pins 18 permit one end of the outer bumper bar to be moved toward the inner bumper bar with the opposite end remaining extended.

An air bag 22 is positioned between the inner bumper bar 14 and the outer bumper bar 17 and is provided with an inflation valve 23 which extends through the bore 16. An air bag 24 is positioned between the inner bumper bar 14 and the outer bumper bar 17 centerly thereof and has an air inflation valve 25 which extends through the bore 16 in the center of the inner bumper bar 14.

In the use and operation of the invention as illustrated in FIGS. 1 through 4 the air bags 22, 24 provide a cushion between the outer bumper bar 17 and the inner bumper bar 14 so that in the case of a collision the outer bumper bar 17 will move toward the inner bumper bar 14 guided by the pins 18 compassing the air bags 22, 24 to thus absorb a great deal of the shock that will otherwise result.

Referring now to FIGS. 5 and 6 a modified cushion bumper is illustrated generally at 30.

The bumper 30 includes bumper brackets 31 and bumper braces 32 of conventional design which extend forwardly from a motor vehicle frame (not shown). An inner bumper bar 33 extends transversely of the bracket 31 and braces 32 and is secured to the forward ends thereof. The inner bumper bar 33 has bores 34 formed therein on oppsotie sides thereof for reasons to be assigned.

An outer channel shaped bumper bar 35 is supported on a pair of pins 36 which pivotally secured to the outer bumper bar 35 between a pair of ears 37 to which they are secured by a pivot pin 38. The pins 36 extend through the bore 34 in the bumper bar 33 and has a head 39 formed on its inner end to prevent the pin 36 from becoming dislodged from the inner bumper bar 33. A roller bearing 40 is rigidly secured to the inner bumper bar 33 surrounding the bore 34 to provide an anti-friction mounting for the pin 36. A secondary inner bumper bar 41 is mounted on the pin 36 and has anti-friction bearings 42 rigidly secured thereto to provide an anti-friction mounting for the pin 36. A tertiary inner bumper bar 43 is mounted on the pins 36 and similarly is provided with bearings 44 to provide an anti-friction mounting for the pins 36.

A coil spring 45 is positioned on the pins 36 separating the inner bumper bar 33 and the secondary inner bumper bar 41. Compression coil springs 46 are mounted on the pins 36 separating the secondary inner bumper bar 41 and the tertiary inner bumper bar 43.

A plurality of air bags 47 are positioned between the outer bumper bar 35 and the tertiary inner bumper bar 43 and have the inflation valve stems 48 extending through the tertiary inner bumper bar 43 to permit conventional inflation thereof.

In the use and operation of the modification illustrated in FIG. 6 the outer bumper bar in collision will compress both the springs 45, the springs 46 and the air bags 47 to absorb the impact of the collision to prevent injury to the occupants of the motor vehicle.

Having thus described the preferred embodiments of the invention it should be understood that numerous structural modifications and adaptations may be resorted to without departing from the spirit of the invention.

What is claimed is:

1. A cushion automobile bumper comprising an inner supporting bumper bar rigidly secured to the frame of a motor vehicle, a channel shaped outer bumper bar positioned in spaced parallel relation to the inner bumper bar, a plurality of other inner bumper bars arranged in spaced parallel relation between said inner supporting bumper bar and said outer bumper bar, means pivotally mounted on said outer bumper bar for supporting said outer bumper bar and said inner bumper bars on said inner supporting bumper bar, a plurality of equidistantly spaced, longitudinally aligned, inflatable air bags positioned between said outer and the first of said inner bumper bars for absorbing collision shocks on said outer bumper bar, said means for supporting the bumper bars on the inner supporting bar comprising pins pivotally secured to said outer bumper bar and slidably mounted through said inner bumper bars, and additional shock absorbing means comprising coil springs mounted between the plurality of inner bumper bars and being supported on the pivoted pins.

* * * * *